(12) United States Patent
Chan et al.

(10) Patent No.: US 7,907,365 B2
(45) Date of Patent: Mar. 15, 2011

(54) APPARATUS FOR CONTROLLING AND SEALING AIRFLOW AROUND DISK DRIVE BYPASS WALLS

(75) Inventors: Andre S. Chan, Milpitas, CA (US); Chisin Chiang, San Jose, CA (US); Ferdinand Hendriks, Morgan Hill, CA (US); Brad Vaughn Johnson, Santa Clara, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 902 days.

(21) Appl. No.: 11/765,662

(22) Filed: Jun. 20, 2007

(65) Prior Publication Data

US 2008/0316640 A1    Dec. 25, 2008

(51) Int. Cl.
*G11B 33/14* (2006.01)
(52) U.S. Cl. .................................................. 360/97.02

(58) Field of Classification Search ............... 360/97.02; 720/648
See application file for complete search history.

(56) References Cited

U.S. PATENT DOCUMENTS

| | | | | |
|---|---|---|---|---|
| 6,646,826 | B1 * | 11/2003 | Haidari et al. | 360/97.02 |
| 7,050,263 | B2 * | 5/2006 | Kojima et al. | 360/97.02 |
| 7,372,662 | B2 * | 5/2008 | Xu et al. | 360/97.02 |
| 7,599,148 | B2 * | 10/2009 | Chan et al. | 360/97.02 |
| 2002/0071203 | A1 * | 6/2002 | Nakamoto et al. | 360/97.02 |
| 2003/0081350 | A1 * | 5/2003 | Wang et al. | 360/97.02 |
| 2005/0041332 | A1 * | 2/2005 | Chan et al. | 360/97.02 |
| 2008/0094747 | A1 * | 4/2008 | Chan et al. | 360/97.02 |

* cited by examiner

*Primary Examiner* — Julie Anne Watko

(57) ABSTRACT

A seal is formed between bypass walls and a cover for a disk drive to improve control and regulation of airflow in the disk drive. The seal is formed with a gasket comprising a bead of form-in-place gasket between the upper edge of the bypass wall and the cover. The seal also may be formed between the cover and the slit shroud, spoiler, and filter. Minimum compression of the gasket is required to form the seal.

11 Claims, 3 Drawing Sheets

APPARATUS FOR CONTROLLING AND SEALING AIRFLOW AROUND DISK DRIVE BYPASS WALLS

BACKGROUND OF THE INVENTION

1. Technical Field

The present invention relates in general to controlling air flow circulation in disk drives and, in particular, to an improved system, method, and apparatus for controlling and sealing airflow around bypass walls in disk drives.

2. Description of the Related Art

Controlling the circulation of air flow within disk drives significantly impacts their performance. Some types of disk drives are equipped with an aerodynamic architecture that utilizes a bypass channel to control, regulate, and advantageously circulate the air flow. Disk drives with full bypass channels employ designs that have intentional air flow leakage along some portions of the air flow path, such as a cooling slot that is adjacent the voice coil motor (VCM), air filter implementation, and a gap between the edges of the bypass channel walls and the cover of the disk drive. Advantages for intentional leakage include enhancement of certain overall flow circulation parameters inside the disk drive and increased cooling capacity for the VCM.

However, one disadvantage for any type of air flow leakage is the loss in air flow efficiency inside the bypass channel itself. In particular, there is a loss of valuable air pressure build up due to leakages and surface friction as the airflow is bypassed through the channel and reintroduced into the disk stack. In particular, leakage through the gap between the bypass channel and the cover amounts to a significant pressure drop on the order of about 200 Pa, even though the separation between the components is at a realistic manufacturing tolerance of approximately 0.65 mm. This parameter, along with data indicating that sufficient air flow circulation and cooling of VCMs are satisfactory based on some designs, suggest that a reduction in air flow losses between the bypass channel and cover would be desirable.

SUMMARY OF THE INVENTION

Embodiments of a system, method, and apparatus for controlling and sealing airflow around bypass walls in disk drives. For example, a gasket such as a bead of form-in-place gasket (FIPG) may be used to seal between the upper edge of the cover and the bypass wall. The invention may be readily extended to seal between the cover and the slit shroud, spoiler, filter, etc. Some embodiments do not require a compression ratio to form an adequate seal, but only a minimum compression from line contact to a low compression amount that only slightly reduces a thickness of the gasket. This readily satisfied requirement avoids causing an adverse effect such as distortion in the disk drive assembly, e.g., of the arm-to-disk position.

The invention has several advantages, including the ability to increase the usable air pressure in disk drives which can increase the air flow rate through a recirculation filter. In addition, an increase in the air flow potential that can be returned to the disk stack assists in momentum and power recovery.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
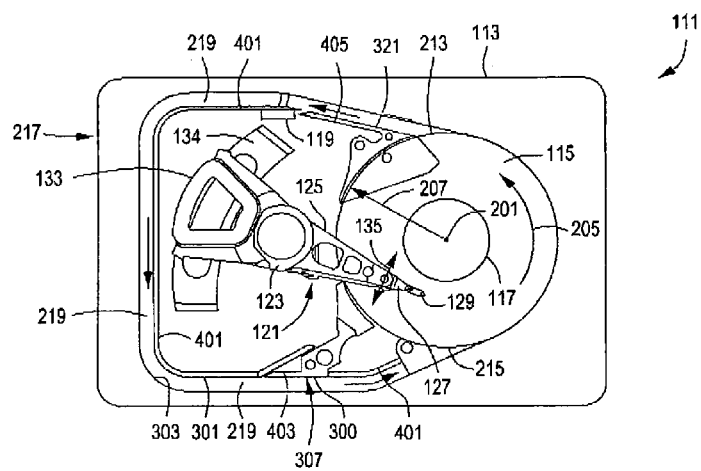
FIG. 1 is a plan view of one embodiment of a disk drive constructed in accordance with the present invention.
Figure 2:
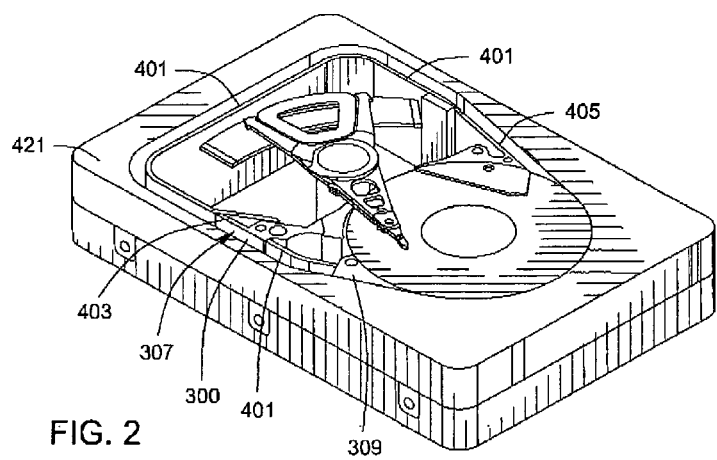
FIG. 2 is an isometric view of the disk drive of FIG. 1 and is constructed in accordance with the present invention.
Figure 3:
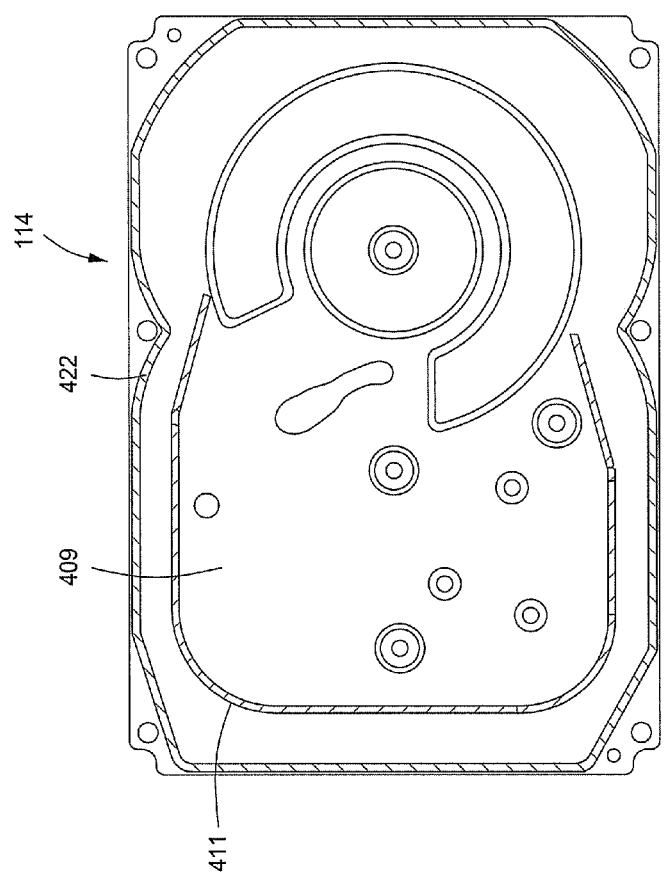
FIG. 3 is a bottom view of one embodiment of disk drive cover constructed in accordance with the invention.
Figure 4:
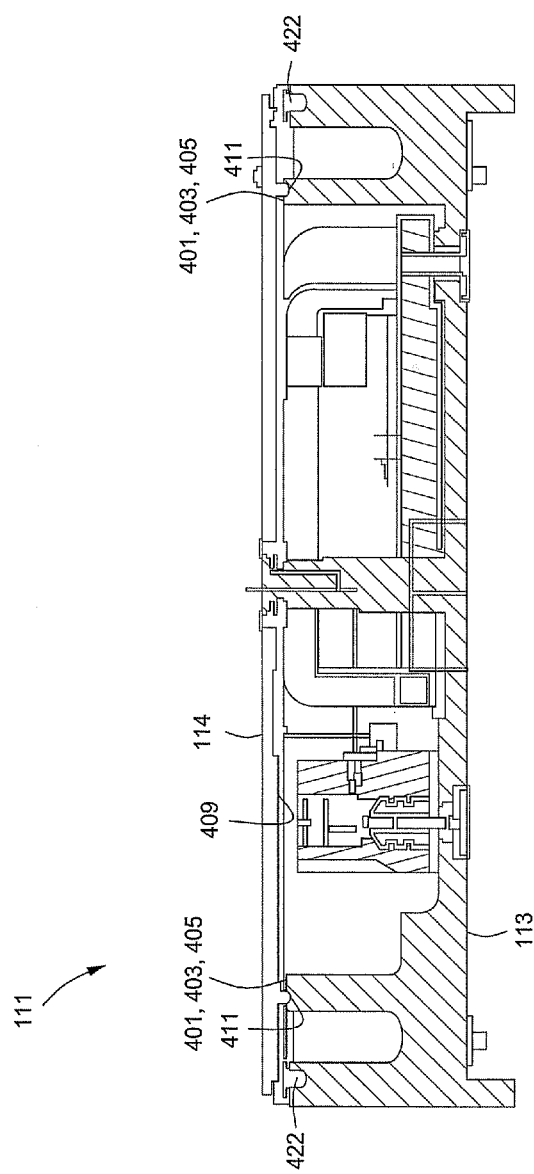
FIG. 4 is a sectional side view of the disk drive and cover of FIGS. 1-3 and is constructed in accordance with the invention.

Referring to FIGS. 1-4, one embodiment of a system, method, and apparatus for an information storage system comprising a magnetic hard disk file or drive 111 for a computer system having an internal seal that is constructed in accordance with the invention is shown. Drive 111 has an outer housing including a base 113 and top cover 114 (FIGS. 3 and 4). The housing contains a disk pack having at least one media disk, e.g., a magnetic disk 115. The disks 115 are rotated (see arrow 205) by a spindle motor assembly having a central drive hub 117. An actuator 121 having one or more parallel actuator arms 125 is movably or pivotally mounted to base 113 about a pivot assembly 123. A controller 119 also is mounted to base 113 for selectively moving the arms 125 relative to disks 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly (HGA) is the head and the slider 129, which are mounted on suspension 127.

Suspensions 127 bias the air bearing surface of the slider 129 against the disk 115 to cause the slider 129 to fly at a precise distance from the disk. A voice coil 133 moves within a conventional voice coil motor magnet assembly 134 and also is mounted to arms 125 opposite the suspensions and head gimbal assemblies. Movement of the actuator 121 (indicated by arrow 135) by controller 119 moves the head gimbal assemblies along radial arcs across tracks on the disk 115 until the heads settle on their respective target tracks. The head gimbal assemblies operate in a conventional manner and typically move in unison with one another.

The disks 115 define an axis 201 of rotation 205 and a radial direction 207 relative to the axis 201. The disks 115 have a downstream side 213 wherein air flows away from the disks 115, and an upstream side 215 wherein air flows toward the disks 115. The drive 111 also has a bypass channel 219 located in the housing 113 for directing the air flow generated by rotation of the disks 115 from the downstream side 213 of the disks 115 to the upstream side 215 of the disks 115. In this way the airflow substantially bypasses the actuator 121.

In the embodiment shown, the bypass channel 219 is located between an outer perimeter 217 of the housing 113 and the actuator 121, such that the bypass channel 219 completely circumscribes the actuator 121. The elements that define the bypass channel 219 may be integrally formed (e.g., cast) with the base 113. In disk drive designs where there is insufficient space to implement a full bypass channel, the bypass channel 219 may be interrupted and is known as a partial bypass. Furthermore, in order to help the bypass airflow negotiate substantial angular changes (channel bends), one or more turning vanes may be placed in those areas.

The embodiment shown also comprises a slit shroud 300. The slit shroud 300 is designed to be integrated and work with the bypass channel 219. The bypass channel 219 includes inner and outer walls 301, 303 that define the conduit for the airflow. At least one opening 305 (FIG. 2) is formed in the inner wall 301 adjacent the actuator 121. The slit shroud 300 may be mounted to the housing adjacent the actuator 121 for maintaining planar shrouding of the media disks 115 and inhibit axial turbulent velocity components with respect to the actuator 121. The slit shroud 300 has a wall feature 307 that is located in and closes the opening 305 when fully installed (FIG. 1) at the inner wall 301 of the bypass channel 219. The wall feature 307 is complementary to the inner wall 301 and, in one embodiment, flush with it as well for contiguous airflow through the conduit and to reduce drag.

In one embodiment, the wall feature 307 of the slit shroud 300 and the inner wall 301 of the bypass channel 219 extend in an axial direction (e.g., vertically) from the housing. The wall feature 307 and the opening 305 may span a linear gap of approximately 1 mm to 20 mm. For example, a typical 3.5-inch server class drive the gap may comprise about 5 mm. As shown in the drawings, the opening 305 may comprise a flat rectangular hole, and the wall feature 307 may comprise a flat rectangular panel that completely covers opening 305.

As shown in the illustrated embodiment of FIG. 2, the opening in the inner wall 301 of the bypass channel 219 is located on the upstream side 215 (reference FIG. 1) of the media disks 115. The opening separates the inner wall 301 into an upstream portion 309 and the remaining downstream portion. The downstream portion of inner wall 301 may extend from the downstream side 213 of the media disk 115 and around the actuator 121 opposite the media disk 115. The upstream portion 309 is located only directly adjacent the upstream side 215 of the media disks 115, such that the downstream portion of the inner wall 301 is much longer than the upstream portion 309.

As shown in the embodiment of FIGS. 1 and 2, the downstream portion 301 may be shortened to provide room for a spoiler 321. Like slit shroud 300, spoiler 321 may be configured to flushly span a gap in the inner wall 301 but adjacent downstream side 213.

In some disk drive embodiments, a load/unload ramp is required for suspensions 127. For those applications, the slit shroud 300 is slidingly installed relative to suspensions 127 (i.e., parallel to the planes defined by suspensions 127) to prevent damage to the components of the drive. If no load/unload ramp is required, the slit shroud 300 (i.e., wall feature 307) may be installed directly downward (i.e., axially) into opening 305 by motion perpendicular to the planes defined by suspensions 127.

One or more elements that define the bypass channel 219 also comprise top surfaces that are parallel to each other. For example, inner wall 301 (e.g., including the downstream and upstream portions) may be configured with a top surface 401 (FIGS. 1 and 2) that extends for its entire distance. Depending on the embodiment, the top surface 401 may include adjacent top surfaces 403, 405 on slit shroud 300 and spoiler 321, respectively. The one or more top surfaces 401, 403, 405, are parallel and thus flush with each other in the axial direction to provide a uniform, circumferential surface that extends around the actuator assembly area. The exterior walls 303 are provided with similar top surfaces 421 (FIG. 2) and have an external seal gasket 422 (FIGS. 3 and 4) to prevent an uncontrolled exchange of air with the external environment to minimize contamination sources.

As shown in FIG. 3, the top cover 114 has an interior surface 409 provided with a gasket 411 that is configured and designed to form a seal against the one or more top surfaces 401, 403, 405 when the top cover is installed on the enclosure 113. In one embodiment, the gasket 411 comprises a thin bead of material, such as form-in-place gasket (FIPG), that fills and seals the designed axial gap that would otherwise be located between top cover 114 and top surfaces 401, 403, 405. The gasket 411 may comprise the same material as the external seal gasket used on the external walls 303.

While the invention has been shown or described in only some of its forms, it should be apparent to those skilled in the art that it is not so limited, but is susceptible to various changes without departing from the scope of the invention.

What is claimed is:

1. A disk drive, comprising:
    a housing having a hub that defines an axis of rotation;
    a media disk mounted to the hub for rotation relative to the housing, the media disk having a downstream side and an upstream side;
    an actuator mounted to the housing and movable relative to the media disk, the actuator having a head for reading data from the media disk;
    a bypass channel located in the housing for directing airflow from the downstream side of the media disk to the upstream side of the media disk, the bypass channel having a wall with a top surface;
    a cover mounted to the housing and having an interior surface; and
    a seal formed between the top surface of the bypass channel wall and the interior surface of the cover.

2. A disk drive according to claim 1, wherein the seal is a form-in-place gasket.

3. A disk drive according to claim 1, wherein a portion of the wall of the bypass channel is formed by a slit shroud mounted to the housing adjacent the downstream side of the media disk, the slit shroud having a top surface that contacts the seal.

4. A disk drive according to claim 1, wherein a portion of the wall of the bypass channel is formed by a spoiler mounted to the housing adjacent the upstream side of the media disk, the spoiler having a top surface that contacts the seal.

5. A disk drive according to claim 1, wherein the bypass channel is interrupted and comprises a partial bypass.

6. A disk drive according to claim 1, wherein the top surface of the bypass channel wall also comprises adjacent top surfaces on a slit shroud and a spoiler, the top surfaces being parallel and flush with each other in the axial direction to provide a uniform, circumferential surface that extends around the actuator and in contact with the seal.

7. A disk drive, comprising:
    a housing having a base, a cover, a hub that defines an axis of rotation, and a radial direction relative to the axis;
    a media disk mounted to the hub for rotation relative to the housing, the media disk having a downstream side and an upstream side;

actuator mounted to the housing and movable relative to the media disk, the actuator having a head for reading data from the media disk;

a bypass channel integrally formed with base for directing airflow from the downstream side of the media disk to the upstream side of the media disk, such that the airflow substantially bypasses the actuator, the bypass channel having a wall with a top surface, the wall defining a conduit for the airflow and an opening in the wall adjacent the actuator;

a slit shroud having a wall feature located in and closing the opening in the wall of the bypass channel, such that the wall feature is complementary to the wall, the slit shroud also having a top surface that is parallel to the top surface of the wall;

a cover mounted to the housing and having an interior surface that defines an axial gap of separation from the top surfaces; and a seal formed between the top surfaces and the interior surface of the cover such that the seal spans the axial gap.

8. A disk drive according to claim 7, wherein the seal is a form-in-place gasket.

9. A disk drive according to claim 7, wherein a portion of the wall of the bypass channel is formed by a spoiler mounted to the housing adjacent the upstream side of the media disk, the spoiler having a top surface that contacts the seal.

10. A disk drive according to claim 9, wherein the top surfaces of the bypass channel wall, the slit shroud, and a spoiler are parallel and flush with each other in the axial direction to provide a uniform, circumferential surface that extends around the actuator assembly area and in contact with the seal.

11. A disk drive according to claim 7, wherein the bypass channel is interrupted and comprises a partial bypass.

\* \* \* \* \*